(12) United States Patent  
Dobschal

(10) Patent No.: US 10,437,066 B2  
(45) Date of Patent: Oct. 8, 2019

(54) IMAGING OPTICAL SYSTEM AS WELL AS DISPLAY DEVICE WITH SUCH AN IMAGING OPTICAL SYSTEM

(71) Applicant: tooz technologies GmbH, Aalen (DE)

(72) Inventor: Hans-Juergen Dobschal, Kleinromstedt (DE)

(73) Assignee: tooz technologies GmbH, Aalen (DE)

( * ) Notice: Subject to any disclaimer, the term of this patent is extended or adjusted under 35 U.S.C. 154(b) by 0 days.

(21) Appl. No.: 15/763,053

(22) PCT Filed: Sep. 6, 2016

(86) PCT No.: PCT/EP2016/070955  
§ 371 (c)(1),  
(2) Date: Mar. 23, 2018

(87) PCT Pub. No.: WO2017/050562  
PCT Pub. Date: Mar. 30, 2017

(65) Prior Publication Data  
US 2018/0275405 A1    Sep. 27, 2018

(30) Foreign Application Priority Data

Sep. 25, 2015   (DE) .................. 10 2015 116 297

(51) Int. Cl.  
*G02B 27/01*    (2006.01)  
*G02B 6/34*    (2006.01)  
(Continued)

(52) U.S. Cl.  
CPC ......... *G02B 27/0172* (2013.01); *G02B 1/041* (2013.01); *G02B 6/0033* (2013.01);  
(Continued)

(58) Field of Classification Search  
CPC .............. G02B 27/017; G02B 27/0101; G02B 27/0106; G02B 27/0145; G02B 27/0172;  
(Continued)

(56) References Cited

U.S. PATENT DOCUMENTS 9,086,569 B1    7/2015  Cakmakci et al.  
2002/0122259 A1    9/2002  Chen et al.  
(Continued)

FOREIGN PATENT DOCUMENTS

DE    102012216581 A1    2/2014

OTHER PUBLICATIONS

International Preliminary Report on Patentability rendered by the International Bureau of WIPO for PCT/EP2016/070955, dated Nov. 16, 2016, 16 pages.

*Primary Examiner* — Sultan Chowdhury  
(74) *Attorney, Agent, or Firm* — Skaar Ulbrich Macari, P.A.

(57) ABSTRACT

An optical element, used as first imaging element, includes a first entry surface and a curved exit surface. A spectacle lens, used as second imaging element, includes a curved second entry surface and a coupling-out section spaced apart therefrom. An imaging optical system images the generated image as a virtual image by guiding the light bundles fed to the optical element via the first entry surface to the curved exit surface, and coupling them from the latter, via the curved second entry surface, into the spectacle lens, in which they are guided to the coupling-out section and coupled out via the coupling-out section to generate the virtual image. To reduce the lateral chromatic aberration in the imaging of the virtual image, the two imaging elements are produced from different materials; one having positive refractive power and the other having negative refractive power for imaging the virtual image.

16 Claims, 2 Drawing Sheets

(51) Int. Cl.
*F21V 8/00* (2006.01)
*G02B 1/04* (2006.01)
*G02C 7/08* (2006.01)

(52) U.S. Cl.
CPC .............. *G02B 6/0038* (2013.01); *G02B 6/34* (2013.01); *G02B 2027/011* (2013.01); *G02B 2027/013* (2013.01); *G02B 2027/0178* (2013.01); *G02C 7/086* (2013.01)

(58) Field of Classification Search
CPC ............ G02B 27/1033; G02B 27/4211; G02B 2027/011; G02B 2027/0116; G02B 2027/0118; G02B 2027/0178
See application file for complete search history.

(56) References Cited

U.S. PATENT DOCUMENTS

| | | |
|---|---|---|
| 2004/0233555 A1 | 11/2004 | Matsunaga |
| 2006/0126181 A1 | 6/2006 | Levola |
| 2007/0008624 A1* | 1/2007 | Hirayama .......... G02B 27/0081 359/630 |
| 2010/0220295 A1 | 9/2010 | Mukawa et al. |
| 2011/0255174 A1* | 10/2011 | Bignolles .......... G02B 27/0101 359/632 |
| 2013/0141527 A1* | 6/2013 | Shimizu .................... G02B 5/32 348/40 |
| 2015/0219898 A1* | 8/2015 | Ko ..................... G02B 27/0172 359/631 |
| 2016/0041393 A1* | 2/2016 | Inagaki .............. G03B 21/2066 359/14 |
| 2016/0147068 A1* | 5/2016 | Wei .................... G02B 27/0172 359/633 |
| 2017/0045743 A1 | 2/2017 | Dobschal et al. |

* cited by examiner

IMAGING OPTICAL SYSTEM AS WELL AS DISPLAY DEVICE WITH SUCH AN IMAGING OPTICAL SYSTEM

PRIORITY

This application claims the benefit of German Patent Application No. 102015116297.0 filed on Sep. 25, 2015, which is hereby incorporated herein by reference in its entirety.

FIELD

The present invention relates to an imaging optical system for a display device that can be fitted on the head of a user and which generates an image from a plurality of pixels from which light bundles emerge, as well as a display device with such an imaging optical system.

BACKGROUND

Imaging optical systems often comprise a spectacle lens with a curved rear side, via which light bundles of the image are coupled out of the spectacle lens for the generation of a virtual image for a user. This spectacle lens-air transition at the curved rear side leads in an undesired manner to a lateral chromatic aberration.

SUMMARY

An object of the invention is to provide an imaging optical system such that an undesired lateral chromatic aberration is reduced as much as possible.

The disclosure includes an imaging optical system for a display device that can be fitted on the head of a user and which generates an image from a plurality of pixels from which light bundles emerge, which comprises an optical element, which has a first entry surface and a curved exit surface, and a spectacle lens, which has a curved second entry surface, a coupling-out section spaced apart therefrom as well as a curved rear side, wherein the curved exit surface is connected to the curved second entry surface and the imaging optical system images the generated image as a virtual image, in that the optical element guides the light bundles fed to the optical element via the first entry surface to the curved exit surface, couples them from the latter, via the curved second entry surface, into the spectacle lens, in which they are guided to the coupling-out section and coupled out by means of the coupling-out section via the curved rear side to generate the virtual image, with the result that the optical element is used as first imaging element and the spectacle lens is used as second imaging element, and wherein, to reduce the lateral chromatic aberration in the imaging of the virtual image, the two imaging elements are produced from different materials; one of the two imaging elements having positive refractive power and the other of the two imaging elements having negative refractive power for imaging the virtual image.

An achromatic system is thus provided by the different materials for the two imaging elements and the connection of the two imaging elements via the curved exit surface, which brings about the desired reduction in the lateral chromatic aberration.

The spectacle lens can have negative refractive power and the optical element can have positive refractive power and the spectacle lens can have a lower Abbe number than the optical element.

Furthermore, both imaging elements can be produced from plastic materials. In particular, plastics which are suitable for injection moulding can be used.

The optical element can be produced from polycarbonate and the optical element can be produced from Zeonex, which is a trade name for a cyclo-olefin polymer.

The refractive powers of the two imaging elements are preferably chosen to be different and the dispersion of the two imaging elements is chosen to be opposite such that the desired lateral chromatic aberration correction is achieved. In particular, the refractive powers and materials of the two imaging elements are chosen such that the condition $f_1 v_1 = -f_2 v_2$ is met, wherein $f_1$ and $f_2$ are the focal lengths of the two imaging elements and $v_1$ and $v_2$ are the Abbe numbers of the two imaging elements.

The connection of the optical element to the spectacle lens is preferably without an air gap. In particular, the optical element and the spectacle lens connected thereto can be free from air gaps.

The curved exit surface of the optical element can be cemented to the curved second entry surface of the spectacle lens.

The curved exit surface of the optical element can have a shape that is complementary to the curved second entry surface of the spectacle lens.

In particular, the curved exit surface of the optical element can be spherically curved.

In addition, the optical element can be arranged in an L-shape together with the spectacle lens.

In particular, the optical element can be formed in one piece. However, it is also possible for it to be formed in several pieces and for the several pieces to be in direct contact with one another (e.g. cemented or glued), with the result that a single optical element is provided. The optical element is, in particular, characterized in that the generated image or the corresponding light is guided in the optical element, which can be formed, e.g., from plastic or glass, without any air gaps.

The first entry surface of the optical element is preferably formed flat. However, it can alternatively be curved.

In addition, the entry surface can serve as reflecting surface for guiding the generated image. The reflection can be brought about e.g. by means of total internal reflection. Thus, the entry surface can act transmissively during the coupling in of the generated image and reflectively during the guiding of the coupled-in. Furthermore, it is possible to form the entry surface partially reflective (e.g. by applying a suitable reflective layer).

Furthermore, the exit surface can serve as reflecting surface for guiding the generated image.

The reflection can be brought about e.g. by means of total internal reflection. Thus, the exit surface can act reflectively during the guiding of the coupled-in image and transmissively during the coupling out of the generated image. Furthermore, it is possible to form the exit surface partially reflective (e.g. by applying a suitable reflective layer).

Furthermore, the first entry surface and the exit surface can be spatially offset with respect to each other and tilted about at least two spatial axes which are independent of each other (preferably about three spatial axes which are independent of each other).

The optical element can, with its exit surface, be in direct contact with the second entry surface of the spectacle lens. The two surfaces can be cemented or glued, for example. A very compact design of the imaging optical system is thus provided. Furthermore, a durable alignment of optical element with spectacle lens can thus be ensured.

Through this contact of the optical element with the spectacle lens, a reduction in stray or scattered light is further advantageously achieved.

The optical element can bring about no reflection, a single reflection or also several reflections between the first entry surface and the exit surface for guiding the generated image. At least one, two, three, four or five reflections are preferably brought about. The number of reflections is preferably in the range from two to ten and is preferably chosen in dependence on the position of an imaging system of the image-generating module and the focal length of the imaging optical system.

The boundary surfaces of the optical element which are not used for guiding and/or coupling in or out the generated image can be blackened and/or light-absorbing. By this means it is possible to suppress scattered light well.

The spectacle lens can have a curved or flat front side. The coupling-out section can have an imaging effect and can be reflective, transmissive and/or refractive.

The spectacle lens and the optical element can, in each case, be produced e.g. from glass or plastic.

The spectacle lens and the optical element together, seen in a view from above, can have an L-shape. In particular, the optical element can protrude from the rear side of the spectacle lens. This can lead to the L-shape described.

The guiding of the generated image or of the light bundles in the optical element and in the spectacle lens can be effected by reflections and/or total internal reflections. If the guiding is to be brought about by reflections, reflective coatings or reflective surfaces are possibly to be provided. The reflections can be brought about on outer boundary surfaces of the spectacle lens and/or of the optical element (such as e.g. front and rear side of the spectacle lens) and/or on surfaces lying inside.

The coupling-out section is spaced apart laterally from the second entry surface. Thus, preferably, at least one reflection or several reflections always take place in the spectacle lens (e.g. one reflection on the front side and one reflection on the rear side of the spectacle lens) for guiding the generated image, after the coupling into the spectacle lens, to the coupling-out section. The coupling-out section is thus preferably spaced apart laterally from the optical element.

In particular, the one reflective surface of the optical element can be formed as aspherical surface. The aspherical surface can, in particular, have no rotational symmetry. In particular, it can be formed as freeform surface. By a freeform surface is meant here in particular a curved surface which has different curvatures in two different main sections and/or which is curved and has no rotational symmetry.

The other reflective surfaces of the optical element can also in each case be formed as aspherical surface and in particular as freeform surface.

The coupling-out section can comprise one or more reflective deflecting surfaces which are reflective or partially reflective for the light bundles. The reflective deflecting surfaces can also be referred to as reflective facets.

The reflective deflecting surfaces can in each case be formed flat or curved. Furthermore, the deflecting surfaces can, in a Fresnel-like manner, reproduce a curved reflecting surface which, in addition to a pure beam deflection, also has an imaging property.

The reflective deflecting surfaces can be formed buried in the spectacle lens. In particular, they can be formed on the front side of the spectacle lens, for example. They can be filled with material of the spectacle lens such that the front side is a smooth, continuous side. If they are filled with a different material from that of the spectacle lens, both materials advantageously have an identical refractive index.

The imaging optical system can be developed such that it generates the virtual image such that it can be perceived superimposed on the surroundings visible through the spectacle lens. A so-called augmented display is thus made possible in which the virtual image is reflected into the user's field of view. It is important here that the user can continue to use the spectacle lens in the conventional manner. He can thus perceive the surroundings through the spectacle lens. With the imaging optical system according to the invention, so-called smartglasses can thus be produced, for example.

The spectacle lens can have a refractive power of zero or a refractive power different from zero (in particular to correct defective vision).

Furthermore, the disclosure includes a display device with a holder that can be fitted on the head of a user, an image-generating module produced on the holder, which generates an image, and an imaging optical system according to the invention (including developments according to the invention thereof) secured to the holder, which, when the holder is fitted on the head, images the generated image such that the user can perceive it as a virtual image.

The holder can be formed like a pair of spectacles and comprise a first and second temple stem, wherein the optical element is arranged at least partially in one of the two temple stems.

When the holder is fitted on the head, the imaging optical system can image the generated image as a virtual image such that the user can perceive it superimposed on the surroundings. A so-called augmented display is thus made possible. The user can therefore continue to use the spectacle lens in the conventional manner. In particular, he can perceive the surroundings through the spectacle lens. The spectacle lens can have a refractive power of zero or a refractive power different from zero (in particular to correct defective vision).

The image-generating module can in particular comprise a two-dimensional imaging system, such as e.g. an LCD module, an LCoS module, an OLED module or a tilting mirror matrix. In particular, the imaging system can comprise an OLED, LCD, LCoS and/or dot-matrix microdisplay. Furthermore, the imaging system can comprise an LED segment display. In addition, the imaging system can comprise a direct-scanning laser display module (possibly with an optical system for pupil matching). Furthermore, the imaging system can comprise a scanning laser display module with scattering medium in an intermediate image plane in front of the optical part or in front of the spectacle lens, and an optical system for pupil matching. The imaging system can be self-luminous or not self-luminous.

The image-generating module can in particular be formed such that a multi-coloured image is generated.

The display device can be formed as smartglasses in which the generated image contains data to be displayed, for example.

The display device can comprise further elements known to a person skilled in the art which are necessary for its operation.

It is understood that the features named above and those yet to be explained below can be used not only in the stated combinations but also in other combinations or alone, without departing from the scope of the present invention.

BRIEF DESCRIPTION OF THE DRAWINGS

In the following, the invention is explained in yet more detail by way of example with reference to the attached drawings, which also disclose features essential to the invention. There are shown in.

Figure 1:
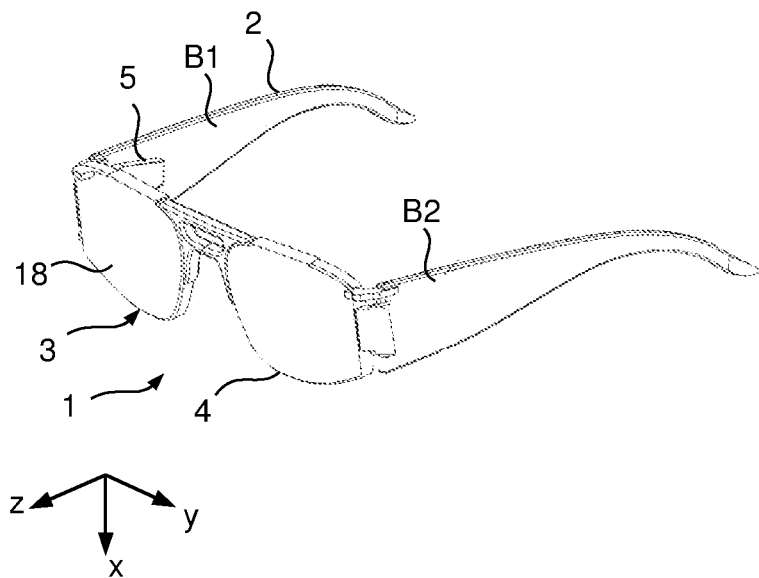
FIG. 1 a schematic perspective representation of an embodiment of the display device according to certain embodiments of the invention.

While the invention is amenable to various modifications and alternative forms, specifics thereof have been shown by way of example in the drawings and will be described in detail. It should be understood, however, that the intention is not to limit the invention to the particular example embodiments described. On the contrary, the invention is to cover all modifications, equivalents, and alternatives falling within the scope of the invention as defined by the appended claims.

DETAILED DESCRIPTION

In the following descriptions, the present invention will be explained with reference to various exemplary embodiments. Nevertheless, these embodiments are not intended to limit the present invention to any specific example, environment, application, or particular implementation described herein. Therefore, descriptions of these example embodiments are only provided for purpose of illustration rather than to limit the present invention.

In the embodiment shown in FIG. 1, the display device 1 according to the invention comprises a holder 2 that can be fitted on the head of a user and is formed in the embodiment described here as a conventional spectacles frame, as well as a first and second spectacle lens 3, 4, which are secured to the holder 2. The holder 2 with the spectacle lenses 3 and 4 can be formed e.g. as sports glasses, sunglasses and/or glasses for correcting defective vision, wherein a virtual image can be reflected into the user's field of view via the first spectacle lens 3, as described below.

Figure 2:
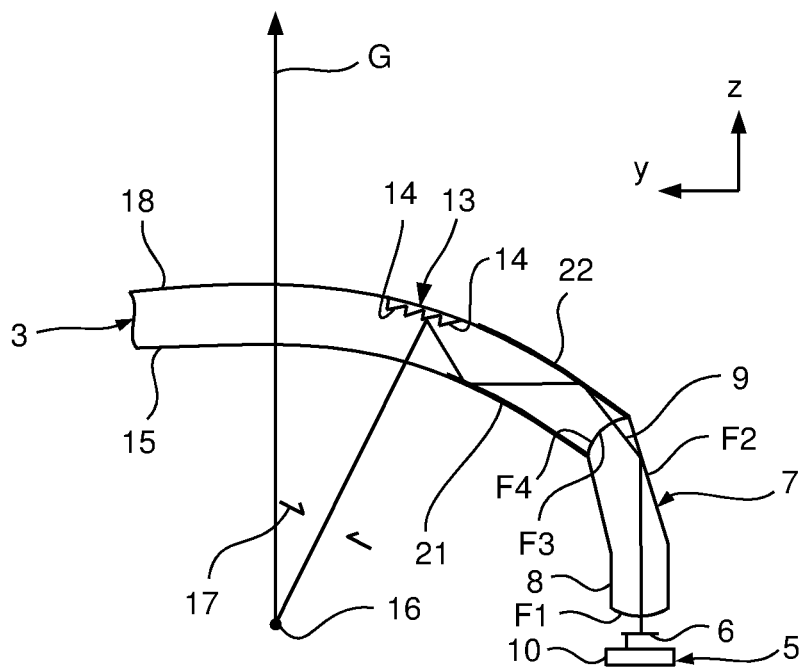
FIG. 2 an enlarged partial sectional view of the imaging optical system including a schematic representation of the image-generating module.

As can best be seen from the enlarged perspective partial view in FIG. 2 (the holder 2 is not represented), the display device 1 comprises an image-generating module 5, which comprises an imaging system 6 (e.g. an OLED module), with which an image can be generated, which is to be reflected into the user's field of view as the virtual image. For this, the display device 1 comprises an imaging optical system 7 which contains an optical element 8 arranged between the imaging system 6 and the first spectacle lens 3. In addition, the first spectacle lens 3 itself also serves as part of the imaging optical system 7.

As such, the imaging optical system 7 is formed as an imaging optical system 7 according to the invention and is preferably designed for a display device that can be fitted on the head of a user and generates an image. The imaging optical system 7 is only described here with the holder 2 according to FIG. 1 to clarify its formation according to the invention. The imaging optical system 7 can, however, also be designed for any other holder.

The imaging system 6 is formed as a two-dimensional imaging system with a plurality of pixels arranged e.g. in columns and rows, wherein a light bundle 9 can emerge from each pixel. The desired image can be generated by correspondingly actuating the pixels (e.g. by means of a control unit 10). In FIG. 2, the beam path of a light beam is drawn in to represent the light bundles 9, with the result that the light beam 9 is also discussed hereafter.

The light beam 9 emerging from the imaging system 6 enters the optical element 8 via a curved first entry surface F1 (which can alternatively also be flat) of the optical element 8 and strikes a flat reflecting surface F2 lying opposite. The light beam 9 is reflected from the reflecting surface F2 to a spherically curved exit surface F3, which is cemented to a second entry surface F4 of the first spectacle lens 3 that is curved complementary to the curved exit surface F3.

The light beam 9 enters the first spectacle lens 9 via the curved second entry surface F4 of the first spectacle lens 3 and is guided in the latter by reflections on front side 18 and rear side 15 of the first spectacle lens 3 to a coupling-out section 13. The coupling-out section 13 comprises several reflective deflecting surfaces 14 arranged next to each other (which can also be referred to as reflective facets), on which a reflection of the light beams 9 takes place in the direction of the rear side 15 of the first spectacle lens 3, with the result that the light beams 9 exit the first spectacle lens 3 via the rear side 15.

Thus, when a user is wearing the display device 1 according to the invention on his head as intended, he can perceive the image generated by means of the imaging system 6 as a virtual image when he looks at the coupling-out section 13. In the embodiment described here, the user must look to the right by approx. 20°-40° relative to the direction of view G of a forward view. In FIG. 2, the centre of rotation 16 of the user's eye, as well as the eyebox 17 or the exit pupil 17 of the imaging optical system, are drawn in for clarification. The eyebox 17 is the area which is provided by the display device 1 and in which the pupil of the user's eye can move and he can still always see the generated image as a virtual image.

Because of the described light bundle guiding of the optical element 8, the latter can also be referred to as light guide 8, in particular as an image-obtaining and/or imaging light guide.

The facets 14 can be formed flat or curved. In the case of a curved formation of the facets, the coupling-out section 13 as a whole can have an imaging effect.

The rear side 15 of the spectacle lens can be spherically curved. Furthermore, the front side 18 of the spectacle lens can be flat or curved.

The curvature of the surfaces F1 to F4, of the rear side 15 and/or of the facets 14 can be a spherical curvature, an aspherical curvature or the curvature of a freeform surface. By a freeform surface is meant in particular a curved surface which has different curvatures in two different main sections and/or which is curved and has no rotational symmetry. In particular, the freeform curvature can be non-spherical and non-rotationally symmetrical.

The optical element 8 is formed such that it can be mounted in the right-hand temple stem B1 of the holder 2. The right-hand temple stem B1 then serves as housing for the optical element 8.

With the display device fitted, the user can perceive the surroundings through the spectacle lenses 3 and 4. The virtual image is thus presented to him superimposed on the surroundings.

Of course, the display device 1 can also be formed such that the direction of view to register the virtual image coincides with the direction of view G straight ahead.

The optical element 8 is preferably formed in one piece and can be produced from a glass material or a plastic material. The first and second spectacle lens 3, 4 can also be produced from a glass material or a plastic material.

Together with the first spectacle lens 3, the optical element 8 images the image generated by means of the imaging system 6 as a virtual image such that the user can perceive it. In this imaging, undesired lateral chromatic aberrations arise (e.g. in the case of the spectacle lens-air transition of the light bundles at the rear side 15). In order to reduce these lateral chromatic aberrations, the imaging optical system 7 is designed such that it acts achromatically. For this, the first spectacle lens 3 and the optical element 8 are formed from different materials which differ as clearly as possible in their Abbe number. In addition, for the imaging of the image, the optical element 8 has a positive refractive power and, for the imaging of the image, the first spectacle lens 3 has a negative refractive power. Together with the curved formation of the exit surface F3, a notional achromatic system is effectively provided, with which the desired reduction in the lateral chromatic aberration is achieved.

As material for the first spectacle lens 3, e.g. polycarbonate with an Abbe number of 30 can be used and, as material for the optical element 8, e.g. Zeonex with an Abbe number of 56 can be used. These materials are advantageously suitable for production by means of injection moulding.

When the values of polycarbonate and Zeonex are compared with the values of known optical glasses, Zeonex corresponds to crown glass and polycarbonate corresponds to flint glass. Through the already-described cementing of the optical element 8 to the first spectacle lens 3 and the choice of a suitable radius of the spherical exit surface F3, a person skilled in the art is able to achieve the desired achromatization. The closer the separation point between the optical element 8 and the first spectacle lens 3 (and thus the spherical exit surface F3) is brought towards the imaging system 6, the more the correction of the lateral chromatic aberration prevails over the longitudinal chromatic aberration, which is known from conventional optics.

The longitudinal chromatic aberration is not so disruptive here because of the relatively small apertures and thereby ranges generally in the depth of field range, while the lateral chromatic aberration is independent of the aperture and yet already noticeably visible. With the imaging optical system 7 according to the invention, the lateral chromatic aberration can be clearly reduced into the sub-pixel range and can be only approx. 1-2 μm, for example, recalculated to the range of the imaging system 6.

Furthermore, it is to be noted that, due to country-specific safety regulations, to some extent only certain materials are permitted in the area in front of the user's eye. For Germany, polycarbonate is included in this, with the result that the use of this material is also advantageous in this respect.

As is shown in the schematic representation in FIG. 2, both the rear side 15 and the front side 18 of the first spectacle lens 3 are formed curved.

To guide light from the second entry surface F4 to the coupling-out section 13, the first spectacle lens 3 comprises two reflective layers 21, 22 lying opposite each other, which extend in each case from the second entry surface F4 to the coupling-out section 13. The first reflective layer 21 is formed on the rear side 15 and the second reflective layer 22 is formed on the front side 18. The same material can be used for the reflective layers 21 and 22 as for the reflective deflecting surfaces 14.

The reflective layers 21 and 22 can also be omitted. In this case, the guiding in the first spectacle lens 3 takes place by total internal reflection on the rear side 15 and the front side 18 of the first spectacle lens 3.

The reflective facets 14 are formed buried and preferably filled with material of the spectacle lens 3 such that the front side 18 is a smooth, continuous side. If they are filled with a different material from that of the spectacle lens 3, both materials advantageously have an identical refractive index.

In the spectacle lens 2 according to the invention, the rear side 15 can in particular have a curvature in order to correct defective vision. It is thereby advantageously achieved that the displayed virtual image can also be perceived sharp by the user since the coupling out of the light bundles 9 is effected via the rear side 15, which is the correcting surface for the user.

Figure 3:
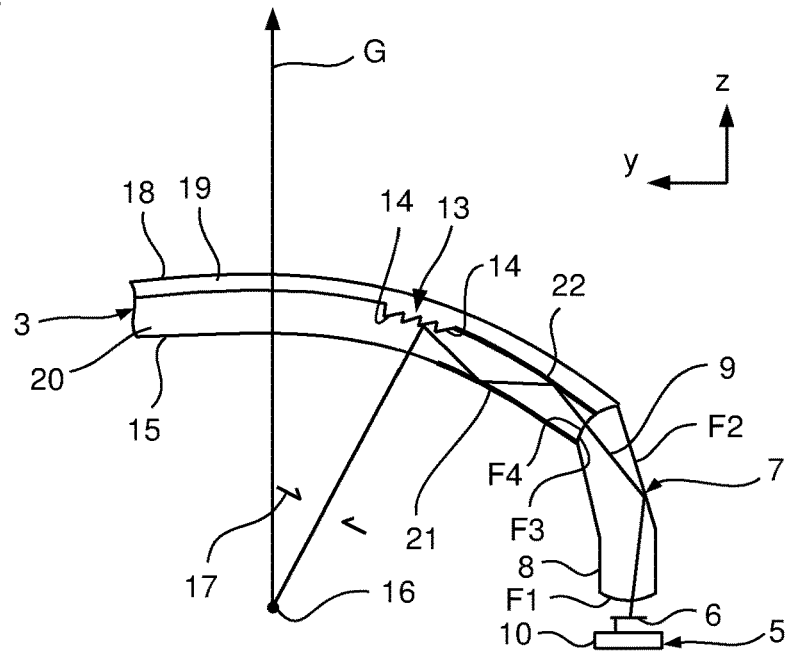
FIG. 3 an enlarged partial sectional view of the imaging optical system of a further embodiment including a schematic representation of the image-generating module, and FIG. 4 an enlarged partial sectional view of the imaging optical system of a further embodiment including a schematic representation of the image-generating module.

In the embodiment described until now, the spectacle lens 3 has a single-shelled structure. A double-shelled structure is also possible, as is shown in FIG. 3. In this case, the spectacle lens 3 comprises an outer shell 19 and an inner shell 20. The reflective layer 22 is formed between the inner and outer shell 20, 19.

Furthermore, the first spectacle lens 3 can have a structure with more than two shells. For example, a further inner shell can be provided, which lies against the inner shell 20. In this case, both reflective layers 21 and 22 would be buried in the spectacle lens 3.

Figure 4:
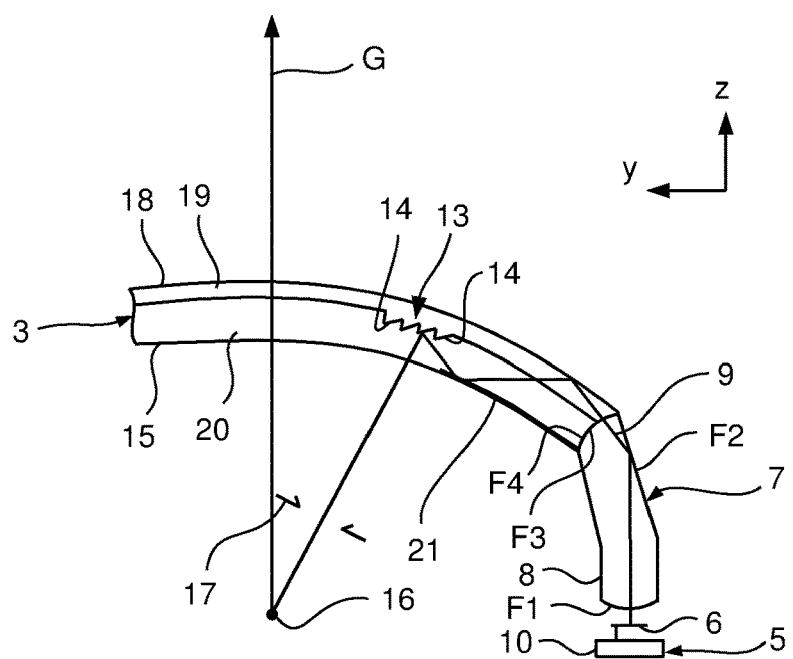

In FIG. 4 is a modification of the spectacle lens according to the invention of FIG. 2, wherein, in this modification, the second reflective layer 22 is not provided and instead a total internal reflection takes place on the front side 18.

The materials of the inner and outer shells 20 and 19 are preferably the same, with the result that they have an identical refractive index. The inner and outer shells 20 and 19 are preferably glued together over the whole surface, with the result that there is a compact first spectacle lens 3.

In the display device 1 according to the invention, the reflection of the virtual image into the user's field of view is effected via the first spectacle lens 3. Of course, a reflection via the second spectacle lens 4 is also possible. In this case, the optical element 8 and the image-generating module 5 can be arranged in the left-hand temple stem B2. In addition, the display device 1 can be formed such that items of information or virtual images are reflected in via both spectacle lenses 3, 4. Here, the reflection can be effected such that a three-dimensional image impression forms. However, this is not absolutely necessary.

The spectacle lenses 3, 4 can have a refractive power of zero or a refractive power different from zero (in particular to correct defective vision). As shown in the figures, both the front side 18 and the rear side 15 of the spectacle lens 3 are formed curved. The front side 18 can, in particular, be spherically curved. If the spectacle lens has a refractive power different from zero, in order to correct defective vision, as a rule the curvature of the rear side 15 is chosen correspondingly, in order to achieve the corresponding correction. The rear side 15 can have a curvature deviating from the spherical shape, in particular therefore be shaped aspherically.

The holder 2 need not be formed as a spectacles-type holder. Any other type of holder with which the display device can be fitted or worn on the user's head is also possible.

While the invention has been described in connection with what is presently considered to be the most practical and preferred embodiments, it will be apparent to those of ordinary skill in the art that the invention is not to be limited to the disclosed embodiments. It will be readily apparent to those of ordinary skill in the art that many modifications and equivalent arrangements can be made thereof without departing from the spirit and scope of the present disclosure, such scope to be accorded the broadest interpretation of the appended claims so as to encompass all equivalent structures and products. Moreover, features or aspects of various example embodiments may be mixed and matched (even if such combination is not explicitly described herein) without departing from the scope of the invention.

The invention claimed is:

1. An imaging optical system for a display device that can be fitted on the head of a user and generate an image from a plurality of pixels from which light bundles emerge, the imaging optical system comprising:
    an optical element, which includes a first entry surface and a curved exit surface; and
    a spectacle lens, which includes a curved second entry surface and a coupling-out section spaced apart therefrom,
    wherein the curved exit surface is connected to the curved second entry surface,
    wherein the imaging optical system images the generated image as a virtual image, in that the optical element guides the light bundles fed to the optical element via the first entry surface to the curved exit surface, couples them from the latter, via the curved second entry surface, into the spectacle lens, in which they are guided to the coupling-out section and coupled out via the coupling-out section to generate the virtual image,
    wherein the optical element is a first imaging element and the spectacle lens is a second imaging element,
    wherein, to reduce the lateral chromatic aberration in the imaging of the virtual image, the first and second imaging elements are formed from different materials, one of the first and second imaging elements has a positive refractive power and the other of the first and second imaging elements has a negative refractive power.

2. The imaging optical system according to claim 1, wherein the spectacle lens has negative refractive power, the optical element has positive refractive power and the spectacle lens has a lower Abbe number than the optical element.

3. The imaging optical system according to claim 1, wherein both of the first and second imaging elements are formed of a respective first and second plastic material.

4. The imaging optical system according to claim 1, wherein the light bundles coupled into the spectacle lens are guided in the spectacle lens to the coupling-out section by at least one of at least one reflection and at least one total internal reflection.

5. The imaging optical system according to claim 1, wherein the coupling-out section comprises one or more reflective deflecting surfaces which are either completely reflective or partially reflective.

6. The imaging optical system according to claim 5, wherein the one or more reflective deflecting surfaces are buried within the spectacle lens.

7. The imaging optical system according to claim 1, wherein the imaging optical system is configured to generate the virtual image such that it can be perceived by the user superimposed on surroundings visible through the spectacle lens.

8. The imaging optical system according to claim 1, wherein the spectacle lens is formed of polycarbonate and the optical element is formed of Zeonex.

9. The imaging optical system according to claim 1, wherein the curved exit surface of the optical element is cemented to the curved second entry surface of the spectacle lens.

10. The imaging optical system according to claim 1, wherein the curved exit surface of the optical element has a shape that is complementary to the curved second entry surface of the spectacle lens.

11. The imaging optical system according claim 1, wherein the curved exit surface of the optical element is spherically curved.

12. The imaging optical system according to claim 1, wherein the optical element is arranged in an L-shape together with the spectacle lens.

13. A display device, comprising:
    a holder that can be fitted on the head of a user;
    an image-generating module secured to the holder, which generates an image; and
    the imaging optical system according to claim 1 secured to the holder,
    wherein, when the holder is fitted on the head of the user, the imaging optical system images the generated image such that the user can perceive the image as a virtual image.

14. The display device according to claim 13, wherein, when the holder is fitted on the head of the user, the imaging optical system images the generated image as a virtual image such that the user can perceive the virtual image superimposed on surroundings visible through the spectacle lens.

15. The display device according to claim 14, wherein the holder is formed as a pair of spectacles and comprises a first and a second temple stem, wherein the optical element is arranged at least partially in one of the two temple stems.

16. The display device according to claim 13, wherein the holder is formed as a pair of spectacles and comprises a first and second temple stem, wherein the optical element is arranged at least partially in one of the two temple stems.

* * * * *